US012619814B2

(12) United States Patent
Ni et al.

(10) Patent No.: US 12,619,814 B2
(45) Date of Patent: May 5, 2026

(54) METHOD, DEVICE, AND COMPUTER PROGRAM PRODUCT FOR DATA AUGMENTATION

(71) Applicant: Dell Products L.P., Round Rock, TX (US)

(72) Inventors: Jiacheng Ni, Shanghai (CN); Bin He, Shanghai (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/502,169

(22) Filed: Nov. 6, 2023

(65) Prior Publication Data

US 2025/0124217 A1 Apr. 17, 2025

(30) Foreign Application Priority Data

Oct. 13, 2023 (CN) .......................... 202311332977.9

(51) Int. Cl.
| | |
|---|---|
| *G06F 40/166* | (2020.01) |
| *G06F 40/279* | (2020.01) |
| *G06V 30/416* | (2022.01) |

(52) U.S. Cl.
CPC .......... *G06F 40/166* (2020.01); *G06F 40/279* (2020.01); *G06V 30/416* (2022.01)

(58) Field of Classification Search
CPC .... G06F 40/166; G06F 40/279; G06V 30/416
See application file for complete search history.

(56) References Cited

U.S. PATENT DOCUMENTS

| | | | | |
|---|---|---|---|---|
| 11,120,334 | B1 * | 9/2021 | Carvalho | ................ H04L 67/52 |
| 2023/0306087 | A1 * | 9/2023 | Krishnan | .............. G06F 16/583 |
| 2023/0325391 | A1 * | 10/2023 | Li | .......................... G06N 20/00 |
| | | | | 707/723 |
| 2024/0177513 | A1 * | 5/2024 | Nasir | ...................... G06F 40/58 |
| 2025/0086432 | A1 * | 3/2025 | Bilek | .................. G06N 3/0455 |
| 2025/0095008 | A1 * | 3/2025 | Moghaddam | ...... G06Q 30/0203 |

OTHER PUBLICATIONS

Jina AI Limited, "Welcome to Jina!" https://docs.jina.ai/, Apr. 18, 2023, 6 pages.

(Continued)

*Primary Examiner* — Courtney Harmon
(74) *Attorney, Agent, or Firm* — Ryan, Mason & Lewis, LLP

(57) ABSTRACT

Embodiments of the present disclosure relate to a method, a device, and a computer program product for data augmentation. The method includes generating an image embedding based on an image in an unstructured document, and generating a text embedding based on text in the unstructured document and associated with the image. The method further includes acquiring descriptive information from a storage library based on the generated image embedding and text embedding. The method further includes adding the acquired descriptive information into the unstructured document. In this way, it can be possible not only to understand and analyze the unstructured document across modalities, but also to enrich it with a characterization of multimodal data in the unstructured document, thus increasing the amount and diversity of data.

20 Claims, 6 Drawing Sheets

(56)     References Cited

OTHER PUBLICATIONS

S. Li, "Named Entity Recognition with NLTK and SpaCy," https://towardsdatascience.com/named-entity-recognition-with-nltk-and-spacy-8c4a7d88e7da, Aug. 17, 2018, 18 pages.

Open AI, "CLIP: Connecting Text and Images," https://openai.com/research/clip, Jan. 5, 2021, 17 pages.

A. Radford et al., "Learning Transferable Visual Models From Natural Language Supervision," International Conference on Machine Learning, arXiv:2103.00020v1, Feb. 26, 2021, 48 pages.

T. Wang et al., "Dataset Distillation," arXiv:1811.10959v3, Feb. 24, 2020, 14 pages.

U.S. Appl. No. 18/486,616 filed in the name of Jiacheng Ni et al. on Oct. 13, 2023, and entitled "Method, Device, and Product for Searching Data."

\* cited by examiner

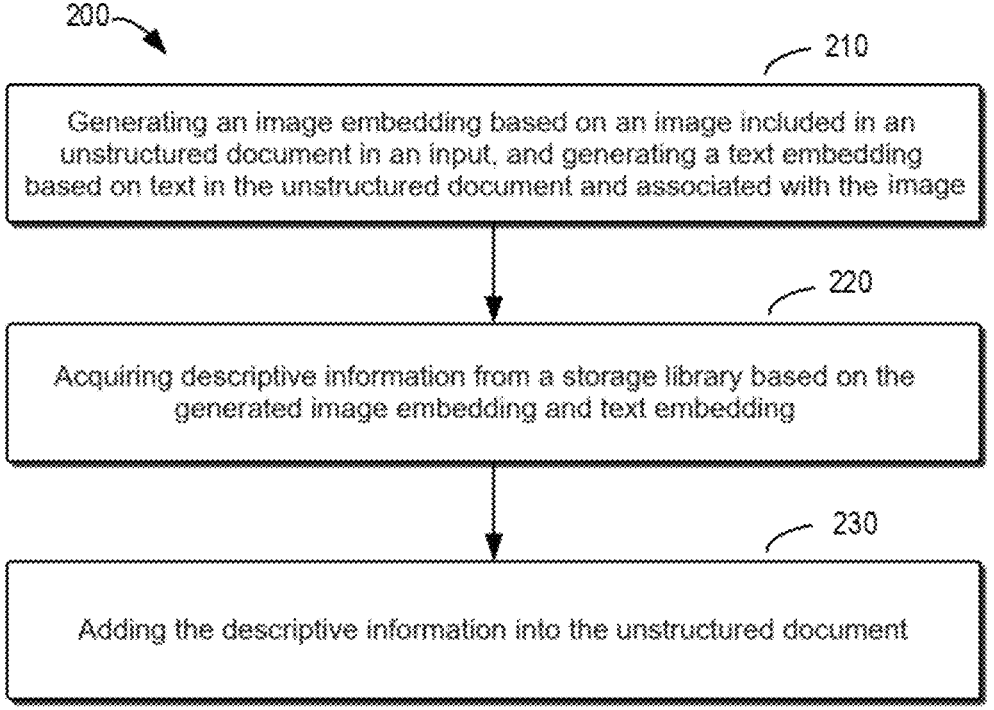

200

210

Generating an image embedding based on an image included in an unstructured document in an input, and generating a text embedding based on text in the unstructured document and associated with the image

220

Acquiring descriptive information from a storage library based on the generated image embedding and text embedding

230

Adding the descriptive information into the unstructured document

The banana, as a fruit of the genus Musa, is one of the most important fruit-bearing crops worldwide. It grows in tropical regions. While most extensively consumed in these regions, it is valued around the world for its flavor, nutritional value, and year-round supply.

410

420

Banana

800

801 CPU

802 ROM

803 RAM

804

805 I/O interface

806 Input unit

807 Output unit

808 Storage unit

809 Communication unit

METHOD, DEVICE, AND COMPUTER PROGRAM PRODUCT FOR DATA AUGMENTATION

RELATED APPLICATION

The present application claims priority to Chinese Patent Application No. 202311332977.9, filed Oct. 13, 2023, and entitled "Method, Device, and Computer Program Product for Data Augmentation," which is incorporated by reference herein in its entirety.

FIELD

Embodiments of the present disclosure generally relate to the field of computers, and in particular to a method, a device, and a computer program product for data augmentation.

BACKGROUND

Unstructured data refers to data that has irregular or incomplete data structures, has no predefined data model, or cannot be or is difficult to be represented in two-dimensional logical tables of databases. As in the case of other types of data, unstructured data has experienced explosive growth. This unstructured data includes various forms of information, such as text, images, audio, video, etc.

The unstructured data is diverse and flexible since it has multiple forms and is not limited to fixed data models as compared with formatted data. In addition, the unstructured data contains a large amount of information, and valuable information may be extracted therefrom for decision-making, judgment, and the like through data mining technology, etc. In order to better process and analyze the unstructured data, it is required to constantly explore new technologies and methods.

SUMMARY

Embodiments of the present disclosure provide a solution for data augmentation. With this solution, it can be possible not only to understand and analyze the unstructured document across modalities, but also to enrich it with a characterization of multimodal data in the unstructured document, thus increasing the amount and diversity of data.

In a first aspect of the present disclosure, a method for data augmentation is provided, the method including generating an image embedding based on an image in an unstructured document, and generating a text embedding based on text in the unstructured document and associated with the image. The method further includes acquiring descriptive information from a storage library based on the generated image embedding and text embedding. The method further includes adding the acquired descriptive information into the unstructured document.

In another aspect of the present disclosure, an electronic device is provided, the device including a processor and a memory, the memory being coupled to the processor and storing instructions thereon, these instructions, when executed by the processor, causing the electronic device to perform actions, these actions including generating an image embedding based on an image in an unstructured document, and generating a text embedding based on text in the unstructured document and associated with the image. These actions further include acquiring descriptive information from a storage library based on the generated image embedding and text embedding. These actions further include adding the acquired descriptive information into the unstructured document.

In still another aspect of the present disclosure, a computer program product is provided. The computer program product is tangibly stored on a non-transitory computer-readable storage medium and includes computer-executable instructions, these computer-executable instructions, when executed by a computer, causing the computer to perform the method or process according to embodiments of the present disclosure.

It should be noted that this Summary is provided to introduce a series of concepts in a simplified manner, and these concepts will be further described in the Detailed Description below. The Summary is neither intended to identify key features or necessary features of the present disclosure, nor intended to limit the scope of the present disclosure.

BRIEF DESCRIPTION OF THE DRAWINGS

By description of embodiments of the present disclosure, provided in further detail herein with reference to the accompanying drawings, the above and other objectives, features, and advantages of the present disclosure will become more apparent, in which:

FIG. 2 is a flow chart of a method for data augmentation according to an embodiment of the present disclosure;

Throughout all the drawings, the same or similar reference numerals generally represent the same or similar elements.

DETAILED DESCRIPTION

Figure 1:
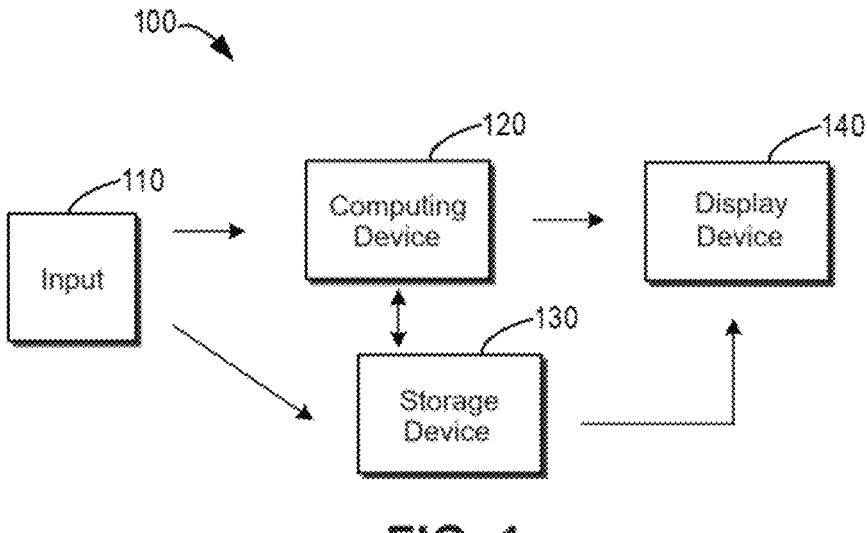
FIG. 1 is a block diagram of an example environment in which a method and/or a process according to an embodiment of the present disclosure may be implemented.

Illustrative embodiments of the present disclosure will be described below in further detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects, unless otherwise specifically indicated.

As described above, like other types of data, unstructured data has experienced explosive growth. Unstructured data comes in various forms and has found important applications in many fields, such as natural language processing, image recognition, speech recognition, etc. Unstructured data is diverse and flexible, and a large amount of usable information may be acquired, e.g., for supporting decision-making by processing and analyzing this data, such as by text mining, sentiment analysis, image recognition, etc. In order to more effectively process and analyze the unstructured data, it is required to constantly study and employ improved technical means.

Unstructured documents are a representative type of unstructured data, and examples of unstructured documents may include, for example, presentation documents in office software, etc. Data augmentation for unstructured documents is an important application that enables the content of documents to be enriched, thus improving their quality and usability. However, there are still some challenges and difficulties during data augmentation for unstructured documents.

Unstructured documents are diverse and flexible due to their lack of fixed and consistent formats and patterns, etc. In addition, unstructured documents generally have more than one type of unstructured data, such as text, images, audio, video, etc. In view of the characteristics of unstructured documents, traditional technologies cannot allow for good understanding of such multimodal unstructured data in unstructured documents, and thus cannot allow for good characterization of such multimodal unstructured data. In addition, in traditional solutions, it is also difficult to establish a knowledge atlas or knowledge base for such multimodal unstructured data in unstructured documents, resulting in the inability to search for or retrieve corresponding knowledge for use in data augmentation for unstructured documents.

To solve at least some of the above and other potential problems, an embodiment of the present disclosure provides a solution for data augmentation. The solution includes generating an image embedding based on an image in an unstructured document, and generating a text embedding based on text in the unstructured document and associated with the image. The solution further includes acquiring descriptive information from a storage library based on the generated image embedding and text embedding. The solution further includes adding the acquired descriptive information into the unstructured document. In this way, it can be possible not only to understand and analyze the unstructured document across modalities, but also to enrich it with a characterization of multimodal data in the unstructured document, thus increasing the amount and diversity of data.

Basic principles and some example implementations of the present disclosure are illustrated below with reference to FIG. 1 to FIG. 8. It should be understood that these example embodiments are given only to enable those skilled in the art to better understand and thus implement embodiments of the present disclosure, and are not intended to limit the scope of the present disclosure in any way.

FIG. 1 is a block diagram of an example environment 100 in which a method and/or a process according to an embodiment of the present disclosure may be implemented. As shown in FIG. 1, the example environment 100 may include an input 110, a computing device 120, a storage device 130, and a display device 140. It should be understood that, only for the purpose of understanding and easy illustration, limited components are shown in the example environment 100 for implementing a solution according to an embodiment of the present disclosure, and embodiments of the present disclosure are not limited thereto. For example, the example environment 100 may further include other different components that facilitate or contribute to the implementation of a solution according to an embodiment of the present disclosure, and the present disclosure is not limited in this regard.

According to an embodiment of the present disclosure, the input 110 may be transmitted to the computing device 120 for processing. In addition, the input 110 may also be stored in the storage device 130 for use in subsequently processed prior knowledge. The input 110 may be or include an unstructured document, e.g., a presentation document or slide document in office software, etc. It should be noted that examples of the unstructured document according to an embodiment of the present disclosure are not limited thereto, and may further include other different unstructured documents such as text documents, social media, emails, etc. Solutions for data augmentation according to an embodiment of the present disclosure may also be applied to these unstructured documents.

According to an embodiment of the present disclosure, the computing device 120 may be configured to perform data augmentation for the input 110. During the data augmentation for the input 110, the computing device 120 may perform preprocessing on an unstructured document included in the input 110, and then may perform various detections, recognitions, etc. for the preprocessed unstructured document. In addition, the computing device 120 may acquire corresponding knowledge data from the storage device 130 based on results of these operations to perform data augmentation on the unstructured document. It should be noted that the computing device 120 is shown in FIG. 1 as one computing device, but this is only illustrative rather than restrictive, and there may be a greater number of computing devices.

By way of example rather than limitation, the computing device 120 may include, but is not limited to, a personal computer, a server computer, a handheld or laptop device, a mobile device (such as a mobile phone, a personal digital assistant (PDA), a multimedia player, etc.), a multi-processor system, a consumer electronic product, a wearable electronic device, an intelligent home device, a small computing device, a mainframe computer, an edge computing device, a distributed computing environment including any one or more of the above devices or systems, etc.

According to an embodiment of the present disclosure, the storage device 130 may be configured to store the input 110 and the results of various operations such as preprocessing, detection, recognition, etc. by the computing device 120 against the input 110. The storage device 130 may also be configured to store knowledge data and a relationship between the unstructured document and the corresponding knowledge data. These data and information stored form a storage library for the unstructured document. It should be noted that the storage device 130 is shown in FIG. 1 as one storage device, but this is only illustrative rather than restrictive, and there may be a greater number of storage devices.

By way of example rather than limitation, the storage device 130 may include, but is not limited to, a local storage device, a remote storage device, etc. In some embodiments, a plurality of storage devices in the storage device 130 may include, but are not limited to, mechanical hard disk drives (HDDs), solid-state drives (SSDs), etc., and some of the plurality of storage devices may be arranged locally, while others may be arranged remotely, e.g., coupled together via a line or network.

The display device 140 may be configured to display an unstructured document per se not having experienced data augmentation, and may also display an unstructured document having experienced data augmentation. In some embodiments, the display device 140 may be integrated to the computing device 120 to reduce overall device size and footprint. By way of example rather than limitation, the display device 140 may include, but is not limited to, a liquid crystal display (LCD), an organic light-emitting diode display (OLED), a projector, etc.

The block diagram of the example environment 100 in which the method and/or process according to an embodiment of the present disclosure may be implemented has been described above in conjunction with FIG. 1. A flow chart of a method 200 for data augmentation according to an embodiment of the present disclosure will be described below with reference to FIG. 2. For better understanding and analysis of an unstructured document, and enrichment of a content of the unstructured document, the method 200 for data augmentation according to an embodiment of the present disclosure is provided.

At 210, an image embedding is generated based on an image included in an unstructured document in an input 110, and a text embedding is generated based on text in the unstructured document and associated with the image. With the generated image embedding and text embedding, the image and the text associated therewith included in the unstructured document can be effectively characterized.

Here, embedding generation at 210 for the image and the text associated therewith may be achieved at a computing device 120 through a pre-trained multimodal deep learning neural network, wherein training data may include paired image and text, and a training process is coordinated. That is, a type of coordinated supervised or semi-supervised learning. In the following, an embedding generation process and a model training process according to embodiments of the present disclosure will be described in further detail.

At 220, descriptive information is acquired from a storage library based on the generated image embedding and text embedding. As described above, the generated image embedding and text embedding enable the image in the unstructured document and the text associated therewith to be effectively characterized. Here, the corresponding descriptive information can be acquired from the storage library based on the generated image embedding and text embedding.

A storage device 130 may include a storage library, where the storage library stores knowledge data, and this prior knowledge may help enrich the unstructured document. The knowledge data stored in the storage library may include descriptive information that corresponds to the corresponding image or text or a combination thereof, and indicates the corresponding image or text or a combination thereof. In some embodiments, the descriptive information may include structured information. In the following, a descriptive information acquisition process according to an embodiment of the present disclosure will be described in further detail.

At 230, the acquired descriptive information is added into the unstructured document. The corresponding descriptive information can be found in the storage library storing the knowledge data based on the generated image embedding and text embedding. The unstructured document can be enriched with the descriptive information found. In some embodiments, the unstructured document to which the corresponding descriptive information is added may be displayed at a display device 140.

With the method 200 for data augmentation according to an embodiment of the present disclosure, it can be possible not only to understand and analyze the unstructured document across modalities, but also to enrich it with a characterization of multimodal data in the unstructured document, thus increasing the amount and diversity of data.

Figure 3:
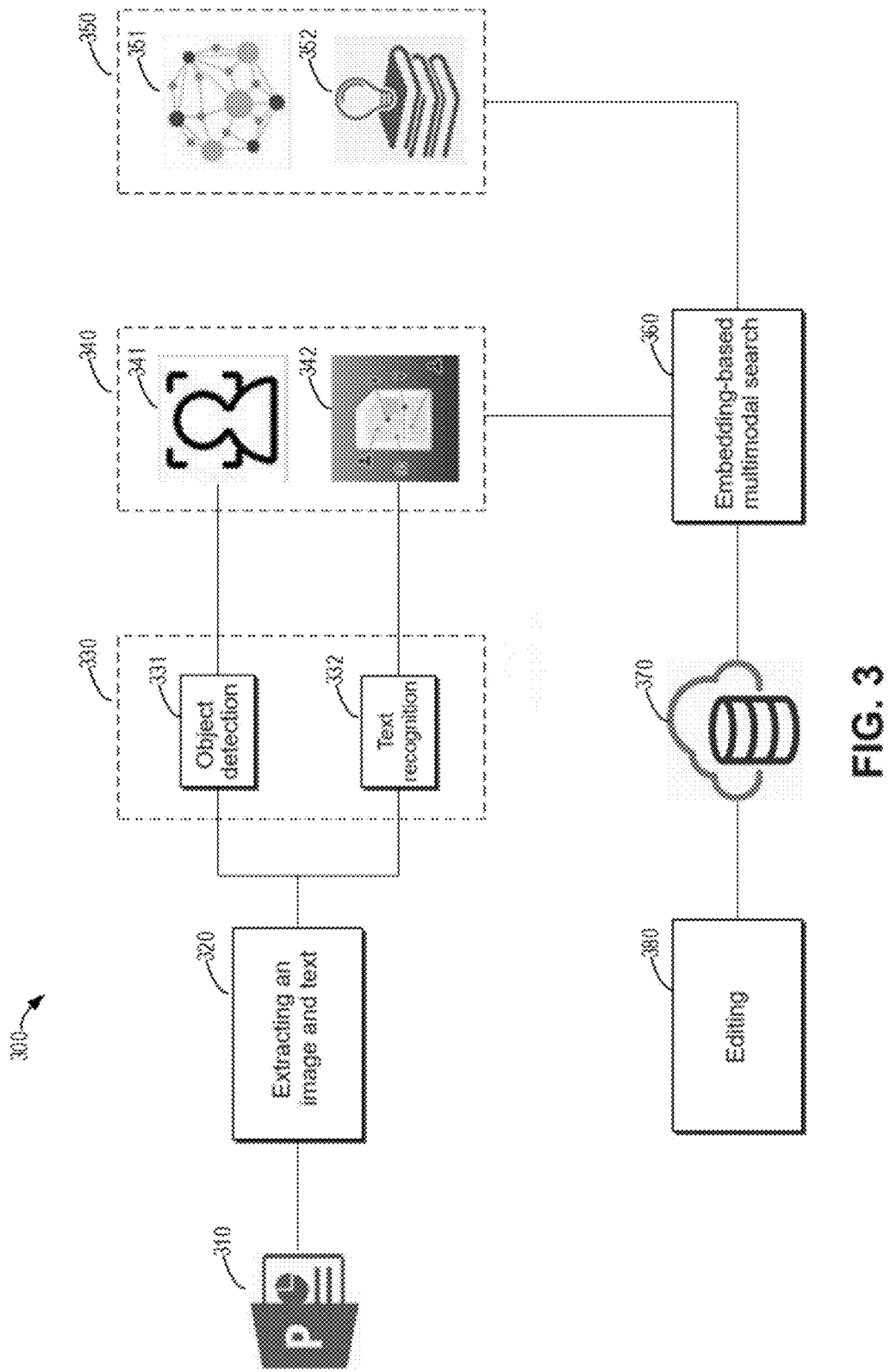
FIG. 3 illustrates a data augmentation process for an unstructured document according to an embodiment of the present disclosure.

FIG. 3 illustrates a data augmentation process 300 for an unstructured document according to an embodiment of the present disclosure. In order to facilitate understanding of the data augmentation process 300 for the unstructured document, only limited operations and components are shown in FIG. 3. However, it should be understood that embodiments of the present disclosure may further include other different operations and components that facilitate or contribute to the implementation of the data augmentation process 300 for the unstructured document, and the present disclosure is not limited thereto.

According to an embodiment of the present disclosure, an image and text may be extracted at 320 from an unstructured document 310. In the example shown in FIG. 3, the unstructured document 310 is shown as a presentation document, which is only exemplary and not restrictive. Examples of the unstructured document 310 may further include text documents, video, audio, etc., and the data augmentation process 300 for the unstructured document according to an embodiment of the present disclosure is also applicable to them. At 320, for example, the image and text may be extracted by optical character recognition (OCR) technology, image recognition technology, natural language processing technology, and speech recognition technology.

According to an embodiment of the present disclosure, the image and text extracted may be processed as illustrated at 330 and 340. In some embodiments, object detection 331 may be performed to detect an object entity 341 from the extracted image, and text recognition 332 may be performed to recognize a tag entity 342 from the extracted text. The object entity 341 is a representative object in the image, e.g., a face in a photo that includes a person. The tag entity 342 is representative text in the text, e.g., a title or important words in an article. The object detection 331 and the text recognition 332 may for example be based on an object detection algorithm (such as YOLOv3) and named entity recognition (NER). For example, one NER machine learning model could detect "December 19" as a date.

According to an embodiment of the present disclosure, it may be possible to encode the detected object entity at 331 as an image embedding, and encode the recognized tag entity at 332 as a text embedding. In some embodiments, encoding for the object entity is performed by an image encoder of a plurality of image encoders and corresponding to the category type of the object entity, and encoding for the tag entity is performed by a text encoder of a plurality of text encoders and corresponding to the category type of the tag entity, wherein the plurality of image encoders and the plurality of text encoders are co-trained in advance based on training data comprising an image-text pair, and wherein the image-text pair comprises an image and text associated with each other. Here, multiple image encoders, multiple text encoders, and an image-text pair for training may be stored in a storage library. This will be described in further detail below.

Figure 4:
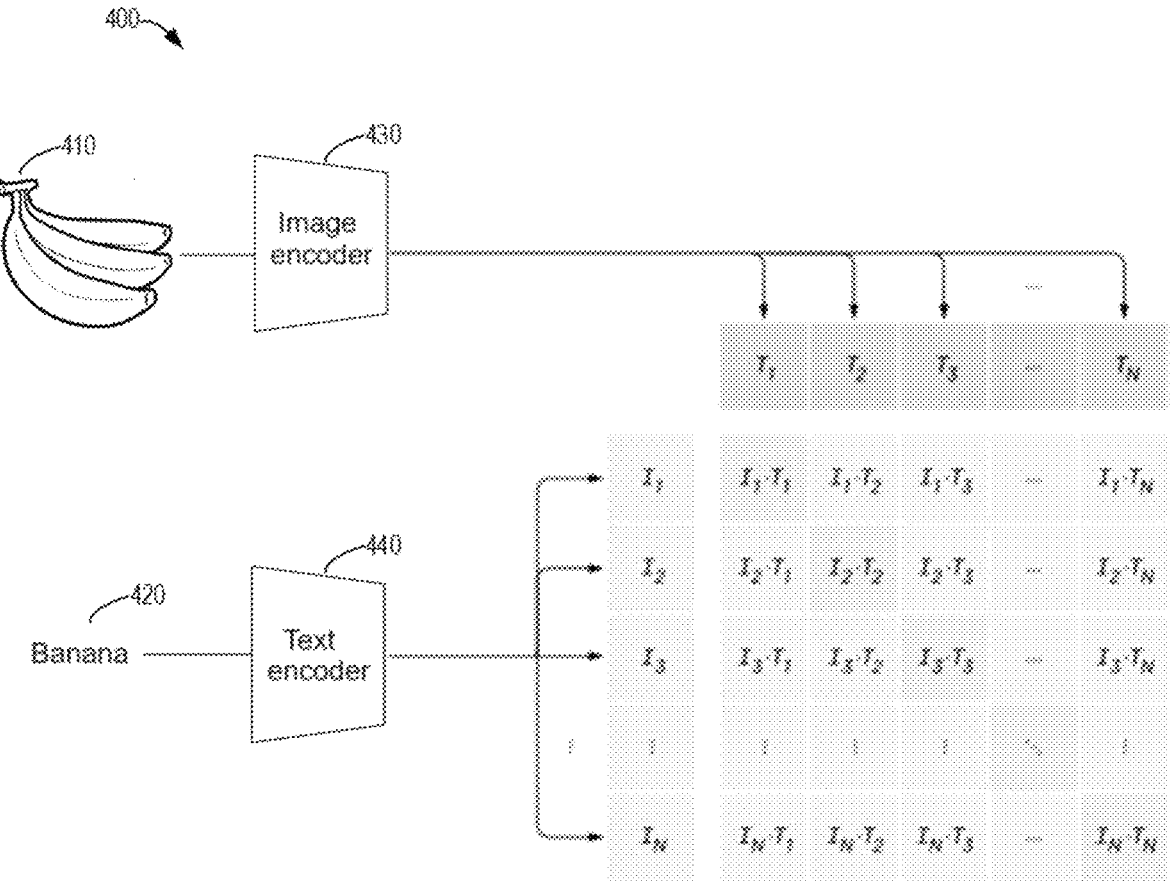
FIG. 4 illustrates an embedding generation process for multimodal data according to an embodiment of the present disclosure.

FIG. 4 illustrates an embedding generation process 400 for multimodal data according to an embodiment of the present disclosure. According to an embodiment of the present disclosure, visual concepts can be effectively learned from natural language supervision using contrastive language-image pre-training (CLIP). The image encoders and the text encoders are pre-trained based on CLIP to predict which images pair with which text.

According to an embodiment of the present disclosure, an object entity detected from an image extracted, i.e., an object entity banana 410 exemplarily shown in FIG. 4, is encoded as an image embedding (also referred to as an object density vector) via a pre-trained image encoder 430 for "fruit" type, and a tag entity recognized from text extracted, i.e., a tag entity "banana" 420 exemplarily shown in FIG. 4, is encoded as a text embedding (also referred to as a tag density vector) via a pre-trained text encoder 440 for "fruit" type. Here, the object entity banana 410 and the tag entity "banana" 420 are associated with each other. A model training process according to an embodiment of the present disclosure may be based on coordinated supervised or semi-supervised learning, and an accurate and robust encoder can be obtained through a large number of available supervised sources. It should be noted that the object entity banana 410 and the tag entity "banana" 420 are only simple examples to help understand the present disclosure.

According to an embodiment of the present disclosure, descriptive information or structured information may be accessed through an image embedding and a text embedding. The image embedding and the text embedding may be stored in a storage library as indexes to knowledge entities. An index building process 500 according to an embodiment of the present disclosure is described below with reference to FIG. 5.

Figure 5:
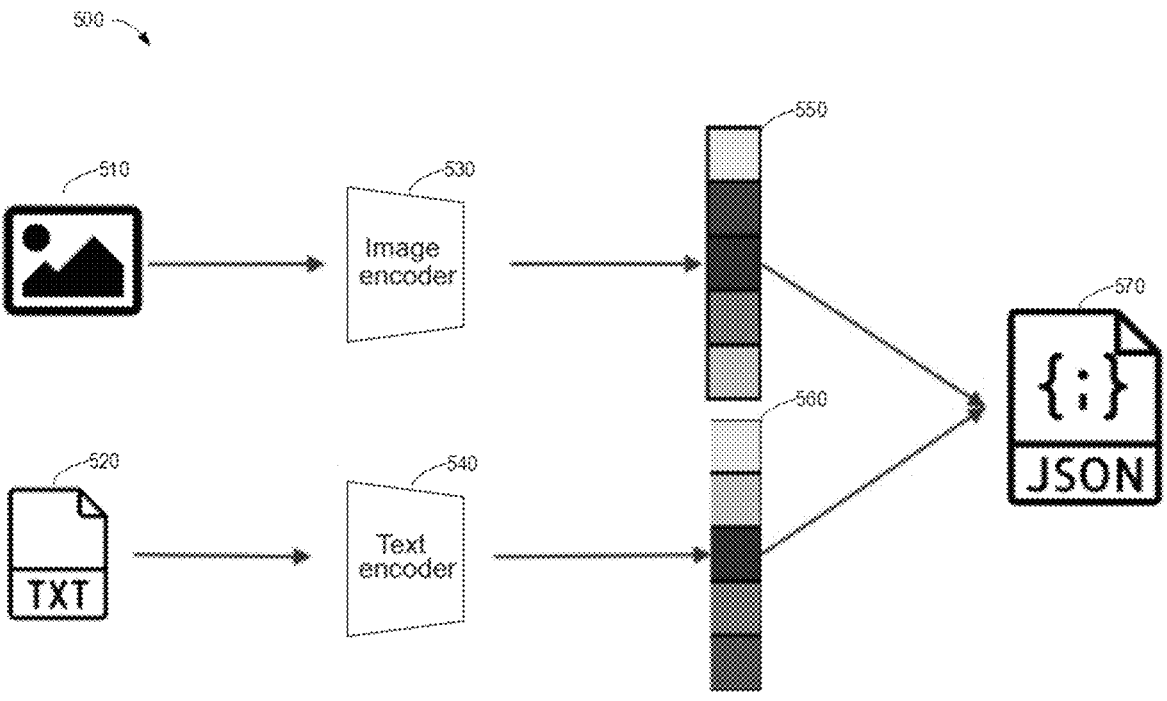
FIG. 5 illustrates an index building process according to an embodiment of the present disclosure.

FIG. 5 illustrates an index building process 500 according to the present disclosure. An image 510 and text 520 are encoded as an image embedding 550 and a text embedding 560, respectively, via an image encoder 530 corresponding to the type of the image 510 and a text encoder 540 corresponding to the type of the text 520. In the example shown in FIG. 5, the image 510 and the text 520 may be an object entity detected from the image and a tag entity recognized from the text, respectively. In some embodiments, the image embedding 550 and the text embedding 560, as well as descriptive information corresponding to the image embedding 550 or text embedding 560 or a combination thereof, are stored as a JSON file 570 in a triple form for use as knowledge data and a knowledge entity in subsequent data augmentation for an unstructured document.

Returning to FIG. 3, after the image embedding and the text embedding characterizing the image in the unstructured document 310 and the text associated therewith are acquired, a storage library 350 may be searched or retrieved based on the acquired image embedding and the acquired text embedding to acquire descriptive information that can be used to enrich the unstructured document 310. As shown in FIG. 3, the storage library 350 may include a knowledge atlas 351 and a knowledge base 352 to store knowledge entities and indicate relationships between them. The storage library 350 according to an embodiment of the present disclosure will be described below in further detail with reference to FIG. 6.

Figure 6:
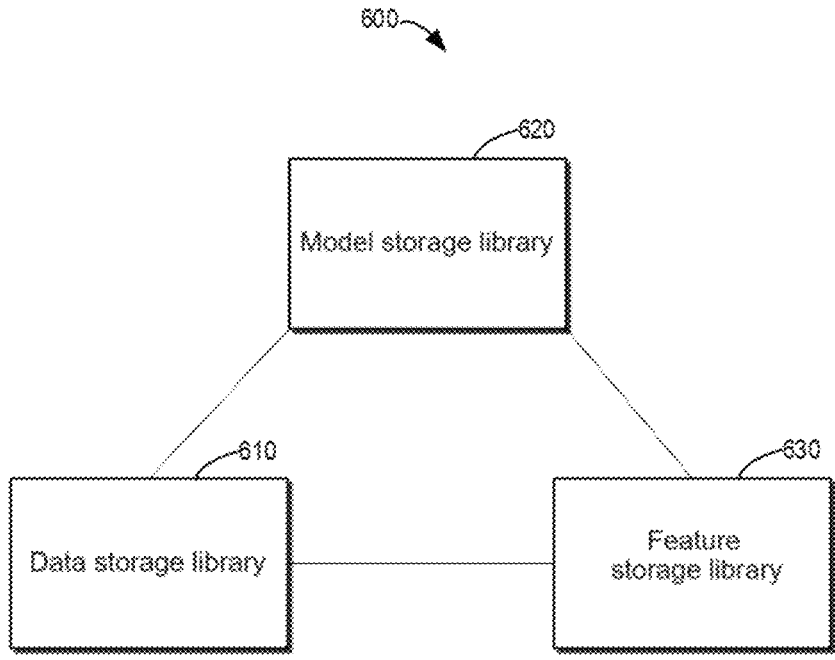
FIG. 6 illustrates an example of a storage library according to an embodiment of the present disclosure.

FIG. 6 illustrates an example 600 of a storage library according to an embodiment of the present disclosure. According to an embodiment of the present disclosure, the storage library may include a data storage library 610, the data storage library 610 being configured to store an image-text pair comprising an image and text associated with each other and descriptive information associated with and corresponding to one of the image and the text associated with each other comprised in the image-text pair, wherein the descriptive information indicates the image and the text associated with each other in the image-text pair.

According to an embodiment of the present disclosure, the storage library may include a model storage library 620, the model storage library 620 being configured to store a plurality of image encoders and a plurality of text encoders, each image encoder of the plurality of image encoders corresponding to a respective type of an object entity of the image, and each text encoder of the plurality of text encoders corresponding to the respective category type of a tag text entity of the text.

According to an embodiment of the present disclosure, the storage library may include a feature storage library 630, the feature storage library 630 being configured to store a plurality of multimodal embeddings, each multimodal embedding of the plurality of multimodal embeddings corresponding to a respective image-text pair. Various embedding representations as described above for characterizing images and text corresponding thereto may be stored in the feature storage library 630 in the storage library.

Returning to FIG. 3 again, at embedding-based multimodal search 360, in order to roughly screen out more relevant knowledge data, according to an embodiment of the present disclosure, a first predetermined number of multimodal embeddings are filtered out from the plurality of multimodal embeddings stored in the feature storage library 630 based on the text embedding. The text embedding is of strong identification, and obviously unrelated knowledge entities can be excluded by taking advantage of characteristics of the text embedding.

According to an embodiment of the present disclosure, a multimodal embedding indicating an image and text in an unstructured document may be generated based on an image embedding and a text embedding, such that multimodal data such as images and text may be characterized across modalities. Similarity of the generated multimodal embedding to each multimodal embedding of the first predetermined number of multimodal embeddings may be determined by comparing the multimodal embedding with the first predetermined number of multimodal embeddings. Next, a second predetermined number of multimodal embeddings among the first predetermined number of multimodal embeddings having similarity to the multimodal embedding higher than a predetermined similarity threshold may be determined as further multimodal embeddings associated with the multimodal embedding, wherein the second predetermined number is less than the first predetermined number. As such, relatively similar or most similar knowledge entities can be searched for or retrieved by using, for example, nearest neighbor search. If the similarity is within a specified threshold, the recognized object entity and tag entity are enriched, e.g., using structured information of the most similar knowledge entities.

According to an embodiment of the present disclosure, an image-text pair corresponding to the determined further multimodal embeddings may be determined, and descriptive information corresponding to the determined image-text pair may be determined. After the associated multimodal embeddings are determined, the corresponding descriptive information may be determined from the storage library 350 based on these multimodal embeddings. The corresponding descriptive information may then be added into the unstructured document 310 to complete data augmentation for the unstructured document 310.

According to an embodiment of the present disclosure, an image and text in the unstructured document 310 and the descriptive information determined at embedding-based multimodal search 360 may be stored in the data storage library 610 in an associated manner, and the multimodal embeddings of the image and text in the unstructured document 310 may be stored in the feature storage library 630 as metadata for use in a subsequent data augmentation process. Such storage can be implemented at least in part at 370 and can be configured to permit editing 380, as illustrated in the embodiment of FIG. 3.

Figure 7:
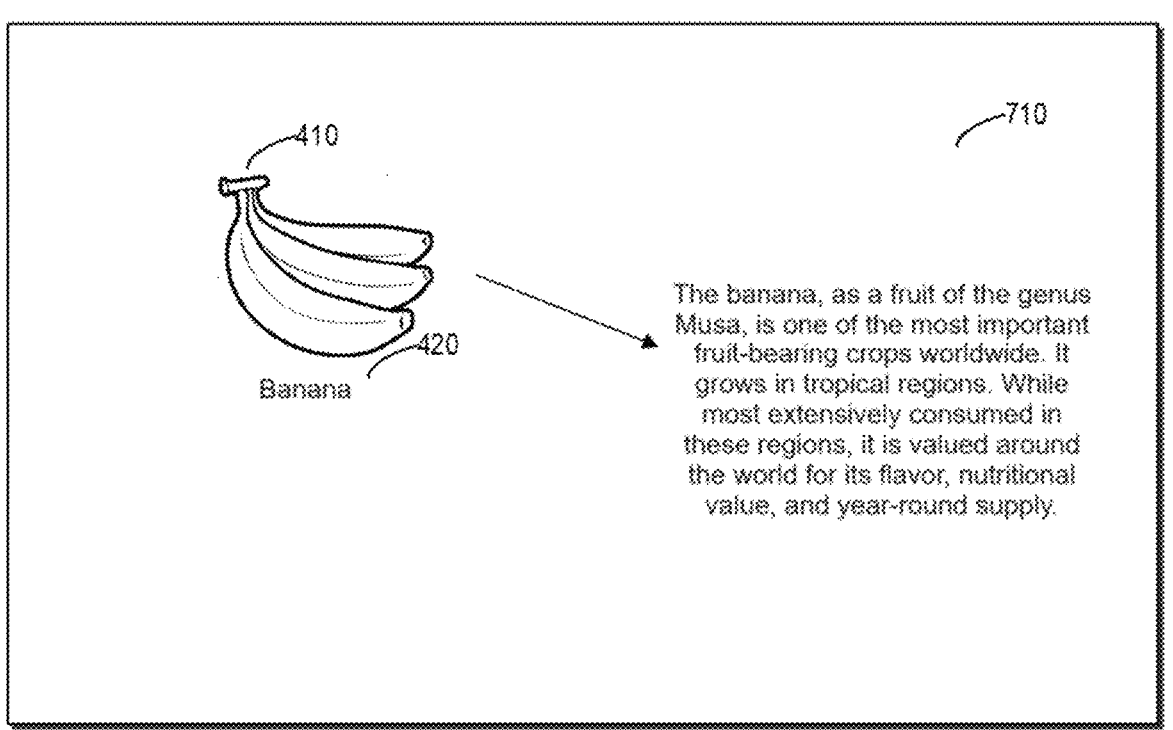
FIG. 7 illustrates an interaction of multiple unified sets of class block storage containers according to an embodiment of the present disclosure.

FIG. 7 illustrates an illustration of an example 700 of an unstructured document with descriptive information added thereto according to an embodiment of the present disclosure. Taking one page of a presentation document as an example, in which an object entity banana 410 and a tag entity "banana" 420 corresponding thereto are included. As to data augmentation for an unstructured document according to an embodiment of the present disclosure, the descriptive information 710 is added to this page of the presentation document. In some embodiments, the added descriptive information 710 may be editable. In addition, in addition to the example shown, it is possible that the descriptive information 710 may further include structured information, such as tabular data, etc.

Figure 8:
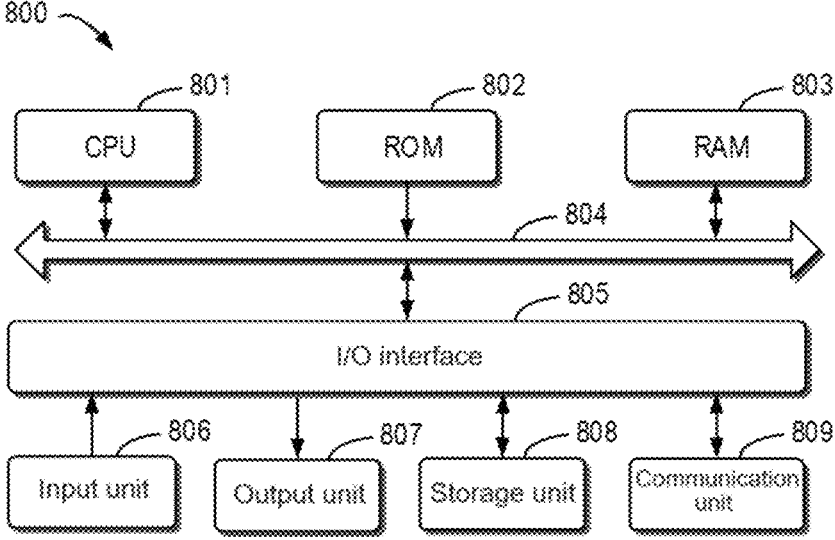
FIG. 8 is a block diagram of an example device that may be used to implement an embodiment of the present disclosure.

FIG. 8 illustrates a block diagram of an example device 800 that may be used to implement some embodiments of the present disclosure. As shown in FIG. 8, the device 800 includes a central processing unit (CPU) 801, which may execute various appropriate actions and processing in accordance with computer program instructions stored in a read-only memory (ROM) 802 or computer program instructions loaded onto a random-access memory (RAM) 803 from a storage unit 808. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of parts in the device 800 are connected to the I/O interface 805, including: an input unit 806, e.g., a keyboard, a mouse, etc.; an output unit 807, e.g., various types of displays, speakers, etc.; a storage unit 808, e.g., a magnetic disk, an optical disc, etc.; and a communication unit 809, e.g., a network card, a modem, a wireless communication transceiver, etc. The communication unit 809 allows the device 800 to exchange information/data with other devices via a computer network, such as the Internet, and/or various telecommunication networks.

The various processes and processing described above, such as the method 200, may be performed by the CPU 801. For example, in some embodiments, the method 200 may be implemented as a computer software program that is tangibly included in a machine-readable medium such as the storage unit 808. In some embodiments, some or all of the computer program may be loaded and/or installed onto the device 800 via the ROM 802 and/or the communication unit 809. When the computer program is loaded into the RAM

803 and executed by the CPU 801, one or more actions of the method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random-access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method for data augmentation, comprising:

generating an image embedding based on an image in an unstructured document, wherein the image embedding comprises a first vector generated by applying at least one object detected in the image to an image encoder;

generating a text embedding based on text in the unstructured document and associated with the image, wherein the text embedding comprises a second vector generated by applying at least a portion of the text to a text encoder;

generating a multimodal embedding based on the first vector and the second vector;

acquiring descriptive information from a storage library based on the multimodal embedding generated using the first vector and second vector corresponding to the respective image embedding and text embedding;

adding the acquired descriptive information into the unstructured document, wherein adding the acquired descriptive information into the unstructured document comprises inserting the acquired descriptive information into the unstructured document to generate an updated version of the unstructured document, the updated version including the acquired descriptive information in addition to the image and the text; and storing the image embedding comprising the first vector, the text embedding comprising the second vector, and the acquired descriptive information as related informational elements in a multi-element unified format to provide image-text pair indexing of the acquired descriptive information, wherein the multi-element unified format comprises a file of a particular file type having an ordered arrangement of the related informational elements, with the image embedding, the text embedding and the acquired descriptive information being stored as respective ones of the related informational elements in the ordered arrangement of the file, and the file being stored as part of the storage library for utilization in subsequent data augmentation operations relating to one or more additional unstructured documents.

2. The method according to claim 1, wherein generating the image embedding comprises:

extracting the image from the unstructured document;

detecting an object entity in the extracted image; and encoding the detected object entity as the image embedding.

3. The method according to claim 2, wherein generating the text embedding comprises:

extracting the text from the unstructured document;

recognizing a tag entity in the extracted text; and encoding the recognized tag entity as the text embedding.

4. The method according to claim 3, wherein encoding for the object entity is performed by an image encoder of a plurality of image encoders and corresponding to the type of the object entity, and encoding for the tag entity is performed by a text encoder of a plurality of text encoders and corresponding to the type of the tag entity, wherein the plurality of image encoders and the plurality of text encoders are preliminarily co-trained based on training data comprising an image-text pair, and wherein the image-text pair comprises an image and text associated with each other.

5. The method according to claim 1, wherein the storage library comprises:

a data storage library, the data storage library being configured to store an image-text pair comprising an image and text associated with each other and descriptive information corresponding to one of the image and the text associated with each other comprised in the image-text pair, wherein the descriptive information indicates the image and the text associated with each other in the image-text pair;

a model storage library, the model storage library being configured to store a plurality of image encoders and a plurality of text encoders, each image encoder of the plurality of image encoders corresponding to a respective type of an object entity of the image, and each text encoder of the plurality of text encoders corresponding to a respective type of a tag entity of the text; and a feature storage library, the feature storage library being configured to store a plurality of multimodal embeddings, each multimodal embedding of the plurality of multimodal embeddings corresponding to a respective image-text pair.

6. The method according to claim 5, further comprising: filtering out, based on the text embedding, a first predetermined number of multimodal embeddings from the plurality of multimodal embeddings stored in the feature storage library.

7. The method according to claim 6, further comprising: determining similarity of the generated multimodal embedding to each multimodal embedding of the first predetermined number of multimodal embeddings by comparing the multimodal embedding with the first predetermined number of multimodal embeddings; and determining, as further multimodal embeddings associated with the multimodal embedding, a second predetermined number of multimodal embeddings among the first predetermined number of multimodal embeddings having similarity to the multimodal embedding higher than a predetermined similarity threshold, wherein the second predetermined number is less than the first predetermined number.

8. The method according to claim 7, wherein acquiring the descriptive information from the storage library comprises:

determining an image-text pair corresponding to the further multimodal embeddings; and determining the descriptive information corresponding to the determined image-text pair.

9. The method according to claim 7, further comprising: storing, in the data storage library, the image and the text in the unstructured document in association with the descriptive information; and storing the multimodal embedding in the feature storage library.

10. The method according to claim 1, wherein the added descriptive information is editable, and the added descriptive information comprises structured information.

11. An electronic device, comprising:

at least one processor; and memory coupled to the at least one processor and storing instructions, wherein the instructions, when executed by the at least one processor, cause the electronic device to perform actions comprising:

generating an image embedding based on an image in an unstructured document, wherein the image embedding comprises a first vector generated by applying at least one object detected in the image to an image encoder;

generating a text embedding based on text in the unstructured document and associated with the image, wherein the text embedding comprises a second vector generated by applying at least a portion of the text to a text encoder;

generating a multimodal embedding based on the first vector and the second vector;

acquiring descriptive information from a storage library based on the multimodal embedding generated using the first vector and second vector corresponding to the respective image embedding and text embedding;

adding the acquired descriptive information into the unstructured document, wherein adding the acquired descriptive information into the unstructured document comprises inserting the acquired descriptive information into the unstructured document to generate an updated version of the unstructured document, the updated version including the acquired descriptive information in addition to the image and the text; and storing the image embedding comprising the first vector, the text embedding comprising the second vector, and the acquired descriptive information as related informational elements in a multi-element unified format to provide image-text pair indexing of the acquired descriptive information, wherein the multi-element unified format comprises a file of a particular file type having an ordered arrangement of the related informational elements, with the image embedding, the text embedding and the acquired descriptive information being stored as respective ones of the related informational elements in the ordered arrangement of the file, and the file being stored as part of the storage library for utilization in subsequent data augmentation operations relating to one or more additional unstructured documents.

12. The electronic device according to claim 11, wherein generating the image embedding comprises:

extracting the image from the unstructured document;

detecting an object entity in the extracted image; and encoding the detected object entity as the image embedding.

13. The electronic device according to claim 12, wherein generating the text embedding comprises:

extracting the text from the unstructured document;

recognizing a tag entity in the extracted text; and encoding the recognized tag entity as the text embedding.

14. The electronic device according to claim 13, wherein encoding for the object entity is performed by an image encoder of a plurality of image encoders and corresponding to the type of the object entity, and encoding for the tag entity is performed by a text encoder of a plurality of text encoders and corresponding to the type of the tag entity, wherein the plurality of image encoders and the plurality of text encoders are preliminarily co-trained based on training data comprising an image-text pair, and wherein the image-text pair comprises an image and text associated with each other.

15. The electronic device according to claim 11, wherein the storage library comprises:

a data storage library, the data storage library being configured to store an image-text pair comprising an image and text associated with each other and descriptive information corresponding to one of the image and the text associated with each other comprised in the image-text pair, wherein the descriptive information indicates the image and the text associated with each other in the image-text pair;

a model storage library, the model storage library being configured to store a plurality of image encoders and a plurality of text encoders, each image encoder of the plurality of image encoders corresponding to a respective type of an object entity of the image, and each text encoder of the plurality of text encoders corresponding to a respective type of a tag entity of the text; and a feature storage library, the feature storage library being configured to store a plurality of multimodal embeddings, each multimodal embedding of the plurality of multimodal embeddings corresponding to a respective image-text pair.

16. The electronic device according to claim 15, wherein the actions further comprise:

filtering out, based on the text embedding, a first predetermined number of multimodal embeddings from the plurality of multimodal embeddings stored in the feature storage library.

17. The electronic device according to claim 16, wherein the actions further comprise:

determining similarity of the generated multimodal embedding to each multimodal embedding of the first predetermined number of multimodal embeddings by comparing the multimodal embedding with the first predetermined number of multimodal embeddings; and determining, as further multimodal embeddings associated with the multimodal embedding, a second predetermined number of multimodal embeddings among the first predetermined number of multimodal embeddings having similarity to the multimodal embedding higher than a predetermined similarity threshold, wherein the second predetermined number is less than the first predetermined number.

18. The electronic device according to claim 17, wherein acquiring the descriptive information from the storage library comprises:

determining an image-text pair corresponding to the further multimodal embeddings; and determining the descriptive information corresponding to the determined image-text pair.

19. The electronic device according to claim 17, wherein the actions further comprise:

storing, in the data storage library, the image and the text in the unstructured document in association with the descriptive information; and storing the multimodal embedding in the feature storage library.

20. A computer program product comprising a non-transitory computer-readable medium having computer-executable instructions stored therein, wherein the computer-executable instructions, when executed by a computer, cause the computer to perform actions comprising:

generating an image embedding based on an image in an unstructured document, wherein the image embedding comprises a first vector generated by applying at least one object detected in the image to an image encoder;

generating a text embedding based on text in the unstructured document and associated with the image, wherein the text embedding comprises a second vector generated by applying at least a portion of the text to a text encoder;

generating a multimodal embedding based on the first vector and the second vector;

acquiring descriptive information from a storage library based on the multimodal embedding generated using the first vector and second vector corresponding to the respective image embedding and text embedding;

adding the acquired descriptive information into the unstructured document, wherein adding the acquired descriptive information into the unstructured document comprises inserting the acquired descriptive information into the unstructured document to generate an updated version of the unstructured document, the updated version including the acquired descriptive information in addition to the image and the text; and storing the image embedding comprising the first vector, the text embedding comprising the second vector, and the acquired descriptive information as related informational elements in a multi-element unified format to provide image-text pair indexing of the acquired descriptive information, wherein the multi-element unified format comprises a file of a particular file type having an ordered arrangement of the related informational elements, with the image embedding, the text embedding and the acquired descriptive information being stored as respective ones of the related informational elements in the ordered arrangement of the file, and the file being stored as part of the storage library for utilization in subsequent data augmentation operations relating to one or more additional unstructured documents.

\* \* \* \* \*